(12) United States Patent
Isler et al.

(10) Patent No.: US 6,719,353 B1
(45) Date of Patent: Apr. 13, 2004

(54) ROLL UP TONNEAU COVER

(76) Inventors: Mark Isler, 3812 Tod Ave., SW., Warren, OH (US) 44481; Lawrence Saxon, 15528 Stoltz Rd., Diamond, OH (US) 44412

( * ) Notice: Subject to any disclaimer, the term of this patent is extended or adjusted under 35 U.S.C. 154(b) by 0 days.

(21) Appl. No.: 10/446,429

(22) Filed: May 29, 2003

(51) Int. Cl.[7] .................................................. B60J 11/00
(52) U.S. Cl. .............. 296/98; 256/100.18; 256/100.17; 256/100.16
(58) Field of Search ................................ 296/98, 100.18, 296/100.16, 100.17, 100.07, 100.15, 100.01, 100.12, 100.03, 37.6, 104, 36, 105

(56) References Cited

U.S. PATENT DOCUMENTS

| | | | |
|---|---|---|---|
| 4,272,119 A | 6/1981 | Adams | |
| 4,757,854 A | 7/1988 | Rippberger | |
| 4,762,360 A | 8/1988 | Huber | |
| 4,792,178 A | 12/1988 | Kokx | |
| 4,923,240 A * | 5/1990 | Swanson | 296/100.18 |
| 5,058,652 A * | 10/1991 | Wheatley et al. | 296/100.18 |
| 5,121,960 A * | 6/1992 | Wheatley | 296/100.18 |
| 5,275,458 A * | 1/1994 | Barben et al. | 296/100.18 |
| 5,301,995 A * | 4/1994 | Isler | 296/100.17 |
| 5,460,423 A * | 10/1995 | Kersting et al. | 296/100.18 |
| 5,487,585 A * | 1/1996 | Wheatley | 296/100.18 |
| 5,511,843 A | 4/1996 | Isler et al. | |
| 5,540,475 A * | 7/1996 | Kersting et al. | 296/100.16 |
| 6,024,401 A * | 2/2000 | Wheatley et al. | 296/100.18 |
| 6,053,558 A * | 4/2000 | Weldy et al. | 296/100.18 |
| 6,257,647 B1 * | 7/2001 | Ninness et al. | 296/100.18 |
| 6,322,129 B2 * | 11/2001 | Huotari | 296/100.17 |
| 6,499,791 B2 * | 12/2002 | Wheatley | 296/100.18 |
| 6,543,836 B1 * | 4/2003 | Wheatley | 296/100.16 |
| 6,568,740 B1 * | 5/2003 | Dimmer | 296/98 |
| 6,575,520 B1 * | 6/2003 | Spencer | 296/100.16 |
| 6,607,234 B1 * | 8/2003 | Schmeichel | 296/100.18 |
| 6,619,719 B1 * | 9/2003 | Wheatley | 296/98 |

OTHER PUBLICATIONS

Exhibit A—The Jeremiah Foundation, Inc.
Exhibit B—The Nehemiah Program.
Exhibit C—The Ameridream Charity, Inc.

* cited by examiner

Primary Examiner—Kiran Patel
(74) Attorney, Agent, or Firm—Harpman & Harpman (57) ABSTRACT

A tonneau cover assembly for use on sports trucks to cover the truck bed. The tonneau cover assembly allows for removable access to the truck bed without fully removing the cover from the truck. A multiple rail support and mounting frame is secured around the perimeter of the truck bed opening with a fabric cover releaseably secured along an upper portion of the frame's upstanding and fixed edges. An end rail secured to the cover is resiliently positioned between oppositely disposed spring urged assemblies on respective rails to stretch the cover in place and then to be secured by independent locking elements resiliently extending from the end rail.

10 Claims, 10 Drawing Sheets

ROLL UP TONNEAU COVER

BACKGROUND OF THE INVENTION

1. Technical Field

This device relates to tonneau covers for truck beds that utilize a support and fastening frame on the bed for selectively securing a cover over the opening defined thereby.

2. Description of Prior Art

Prior art devices of this type have used a variety of different cover and frame configurations to support and secure the cover over the open truck bed against inclement weather and foreign debris. Such covers also conceal cargo and improve the aerodynamics by imparting a flush, smooth, wind resistant surface to the truck bed. A number of fastening methods have been developed including the traditional snap fasteners in which the perimeter edge of the cover is registerably secured to a support rail frame by pairs of interconnecting mechanical snaps. Fabric securing systems utilizing hook and loop fastening elements have also been used; see for example U.S. Pat. Nos. 4,272,119 and 4,757,854.

Quick removable cover assemblies can be seen in U.S. Pat. Nos. 3,804,766, 4,762,360 and 4,792,178.

A number of hinge cover assemblies have been developed in prior art that allow easy access to the truck bed by lifting up a portion or all of the cover on a separate self-supporting frame held open by lift arms, see U.S. Patents Applicants own U.S. Pat. Nos. 5,301,995 and 5,511,843 are directed towards tonneau cover assemblies with transverse support bows extending between respective side parallel mounting rails.

SUMMARY OF THE INVENTION

A tonneau cover for truck beds that provides a detachable retractable cover selectively attached to a support frame which is secured along portions of the perimeter edge of the truck bed defining an opening. The cover has an elongated contoured end rail that is resiliently engaged between spaced parallel fixed support rails utilizing spring urged stretching brackets with a locking and release retention latch configuration.

DESCRIPTION OF THE PREFERRED EMBODIMENT

Figure 1:
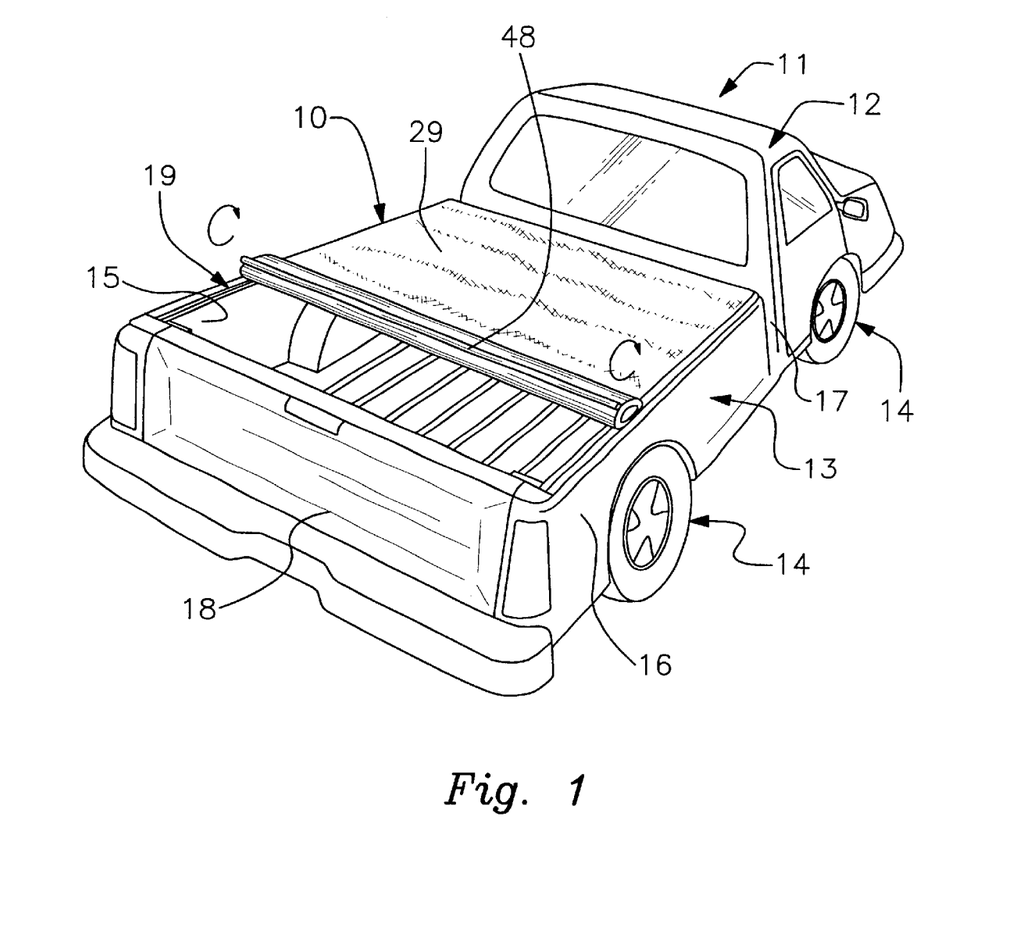
FIG. 1 is a perspective view of a truck bed with the invention installed in partial retractable position thereon.

Referring to FIG. 1 of the drawings, a retractable tonneau cover assembly 10 can be seen installed on a truck 11 having a cab portion 12, a bed portion 13 and wheel assemblies 14. The bed portion 13 has oppositely disposed parallel sidewalls 15 and 16 and an interconnecting end wall 17 adjacent the cab portion 12. A hinge tailgate 18 is movably disposed between the open ends of the sidewalls 15 and 16 thus defining the interior of the truck bed.

Figure 6:
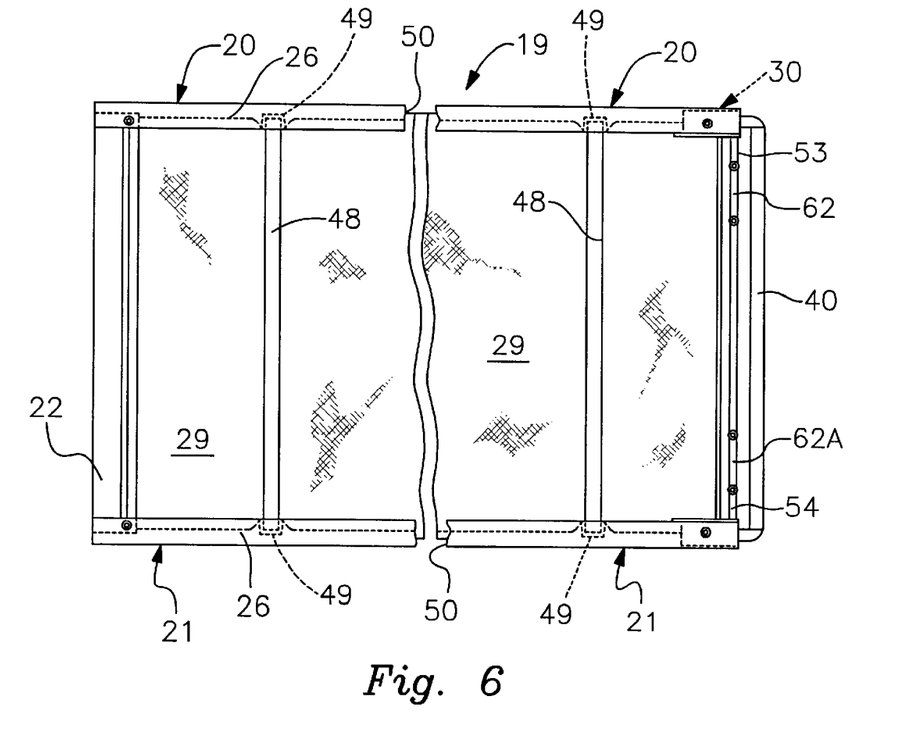
FIG. 6 is a bottom plan view of the cover assembly of the invention with portions broken away.

The retractable tonneau cover assembly 10 of the invention has a main support frame 19 comprised of oppositely disposed elongated support side rails 20 and 21 which are interconnected by a front rail 22 secured thereto forming a generally U-shaped configuration as best seen in FIGS. 1 and 6 of the drawings.

Figure 10:
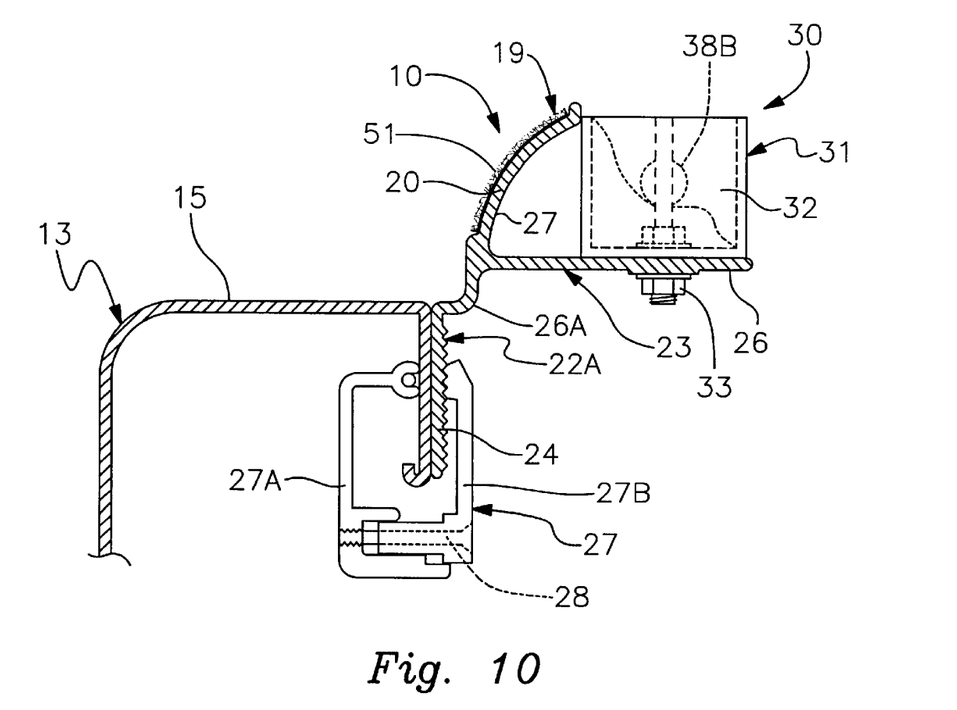
FIG. 10 is an enlarged partial cross-sectional view of the support rail secured to the respective side of the truck bed.

Each of the respective side rails 20 and 21 are formed from an identical metal extrusion having a wall engagement portion 22A and a tonneau engagement portion 22B. The wall engagement portion 22A has a vertically oriented engagement surface 24 extending there from with an offset transition area 25. The tonneau engagement portion 23 has a base element 26 with an upstanding curved element 27 extending there from, best seen in FIGS. 2 and 10 of the drawings. The side rails 20 and 21 are secured to their respective side walls 15 and 16 of the truck bed portion 13 by a plurality of longitudinally spaced mechanical clamps 28. Each of the clamps 28 is formed of a two-part construction with a sidewall engagement bracket 28A and an interdisposed rail engagement bracket 28B in slidably disposed relation. The brackets 28A and 28B are adjustably secured to one another by a threaded fastener 28C as seen in FIG. 10 of the drawings which is common within the industry.

Figure 8:
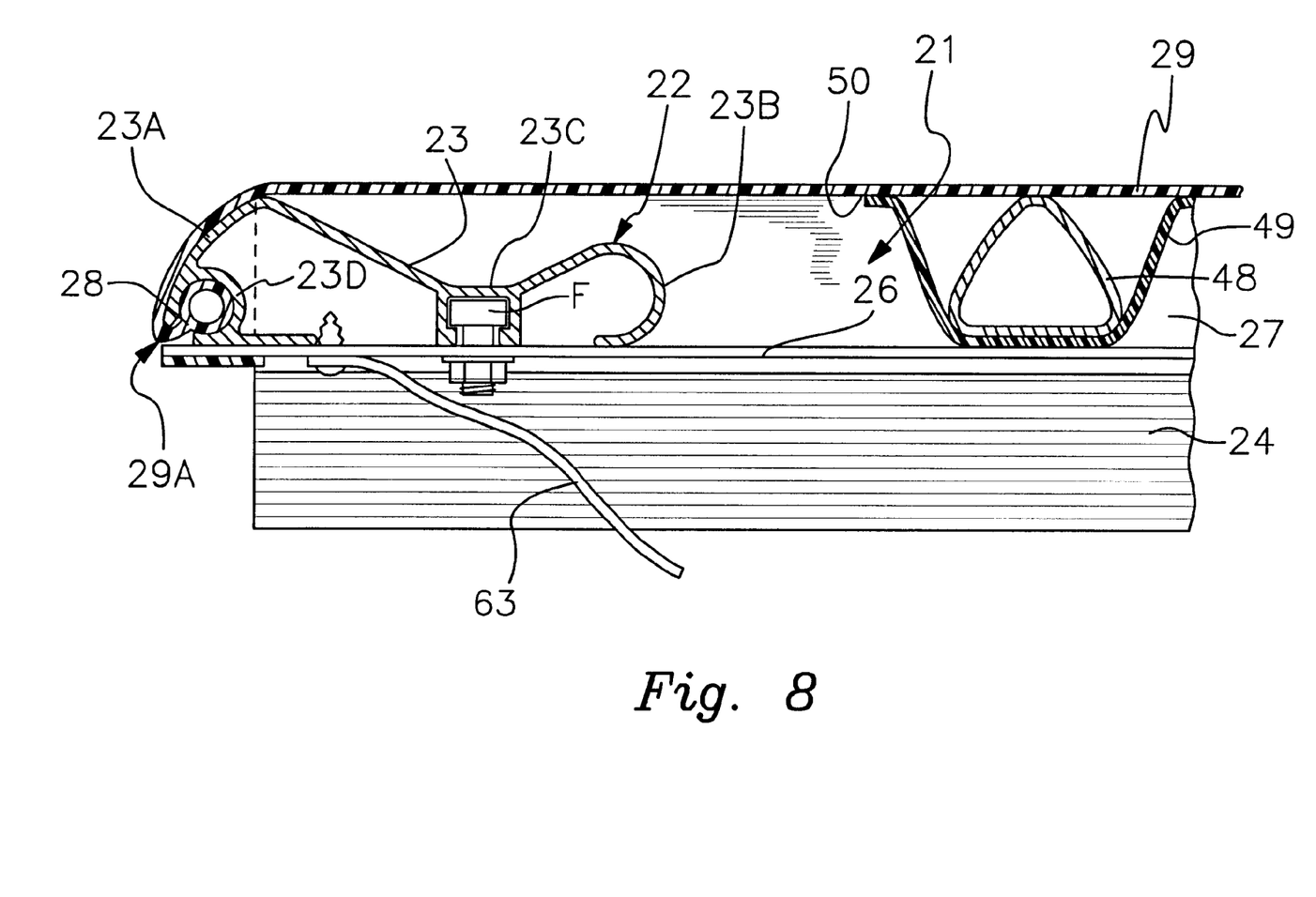
FIG. 8 is an enlarged partial cross-sectional view of a front support mounting and rail of the invention.
Figure 9:
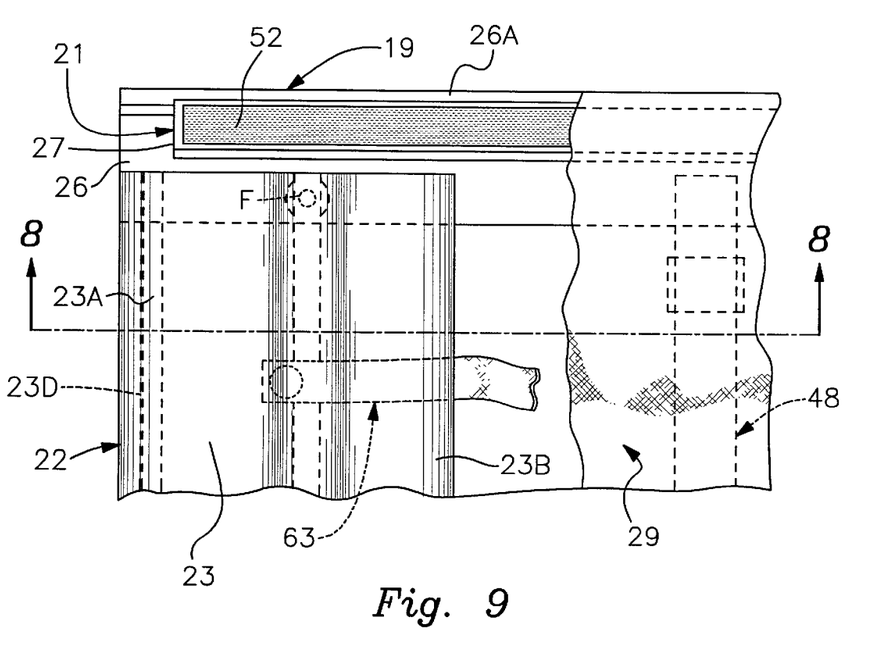
FIG. 9 is an enlarged partial top plan view of the front support and mounting rail of the invention.

Referring now to FIGS. 6, 8 and 9 of the drawings, the front rail 22 of the invention can be seen secured between the respective ends of the side rails 20 and 21 adjacent the cab portion 12 of the truck 11 as noted. The front rail 22 is secured by a pair of fasteners F extending from a channel 22A through inner aligned apertures A in the respective side rails base 26 as will be well understood by those skilled in the art and as best seen in FIG. 8 of the drawings. The front interconnecting rail 22 is preferably of a metal extrusion configuration having a contoured upper surface 23 with an elongated cover engagement and attachment surface 23A and oppositely disposed end portion 23B. The cover engagement and attachment surface 23 A having an elongated arcuate channel 23C formed therein.

A fabric cover 29 of the tonneau cover assembly 10 is secured along its front edge 29A to a synthetic resin channel insert 28 which is in turn slidably disposed within a respective channel 23C therein effectively securing the front edge of the cover through the front interconnecting rail 22. Resilient engagement assemblies 30 can be seen having a sliding block 31 with a tapered engagement end wall 32. A guide fastener 33 extends from the block 31 through an elongated guide opening 34 in the base 26 of the respective side rails 20 and 21. A spring assembly 38 extends from an L-shaped mounting bracket 36 secured to the base 26 of the respective rails in spaced relation to the blocks 31.

The spring assemblies 38 have a spring retainer 38A with a spring 38B extending there from for engaging the sliding block 31 providing a resilient retention thereto as indicated by directional arrows. The engagement assemblies 30 are positioned inwardly of the respective free ends 20A and 21A of the side rails 20 and 21 and provide a positive resilient engagement for the cover 29 as will be hereinafter described.

Figure 2:
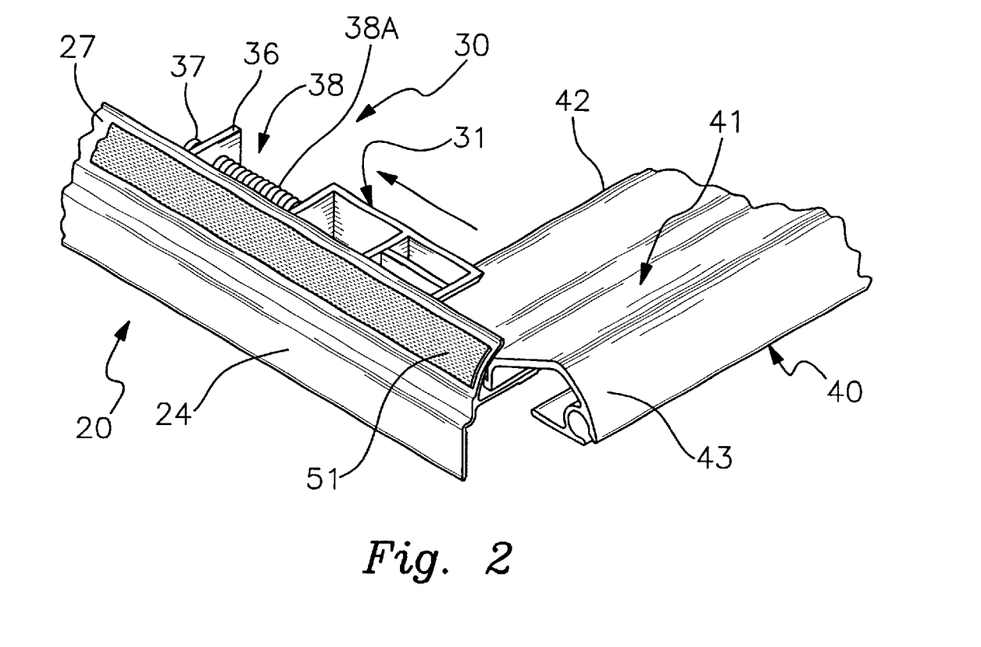
FIG. 2 is an enlarged partial perspective view of an inner engagement retaining element for the bed cover of the invention.
Figure 3:
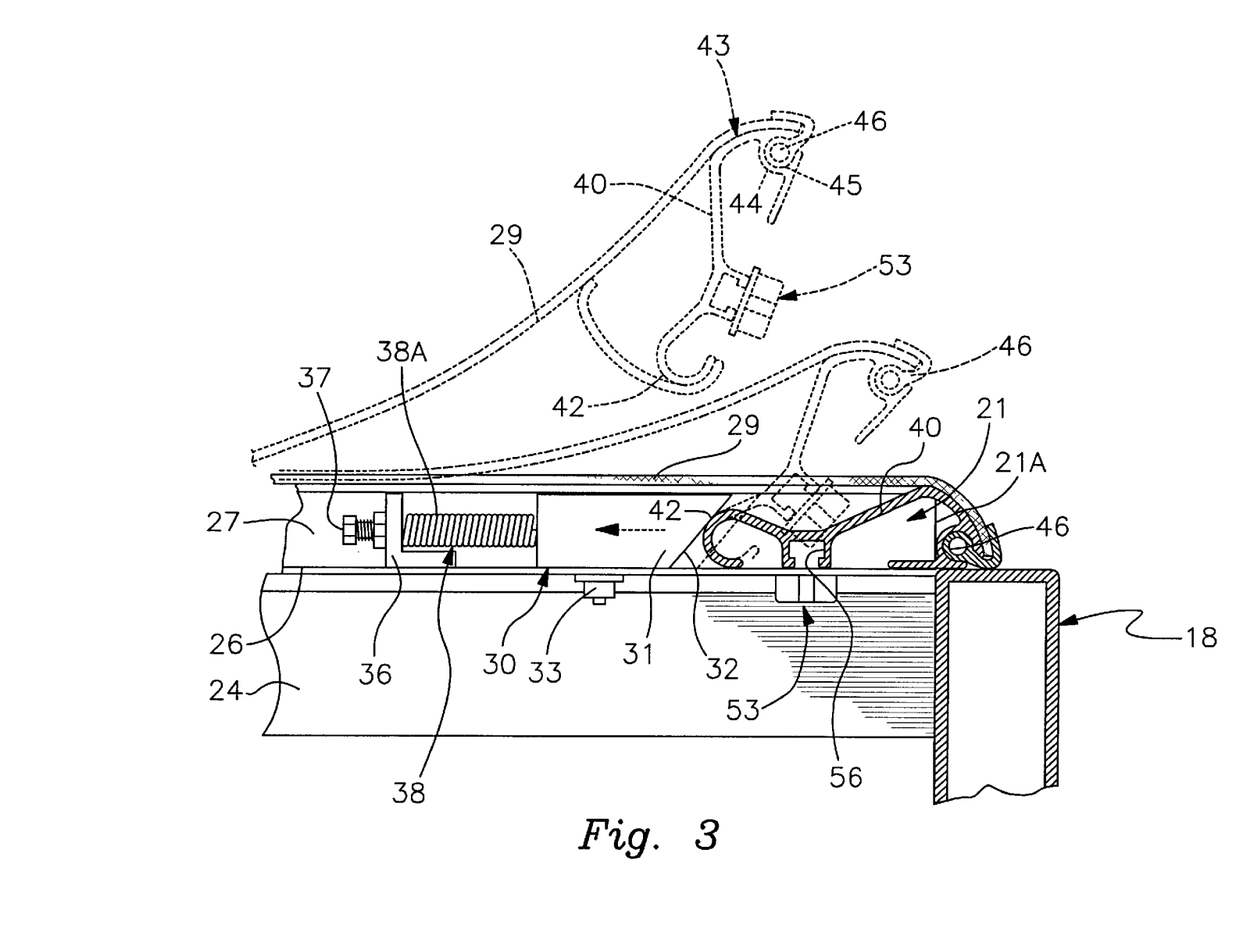
FIG. 3 is a partial side elevational view of the retaining element in fully engaged position in solid lines and disengaged in multiple broken lines.
Figure 4:
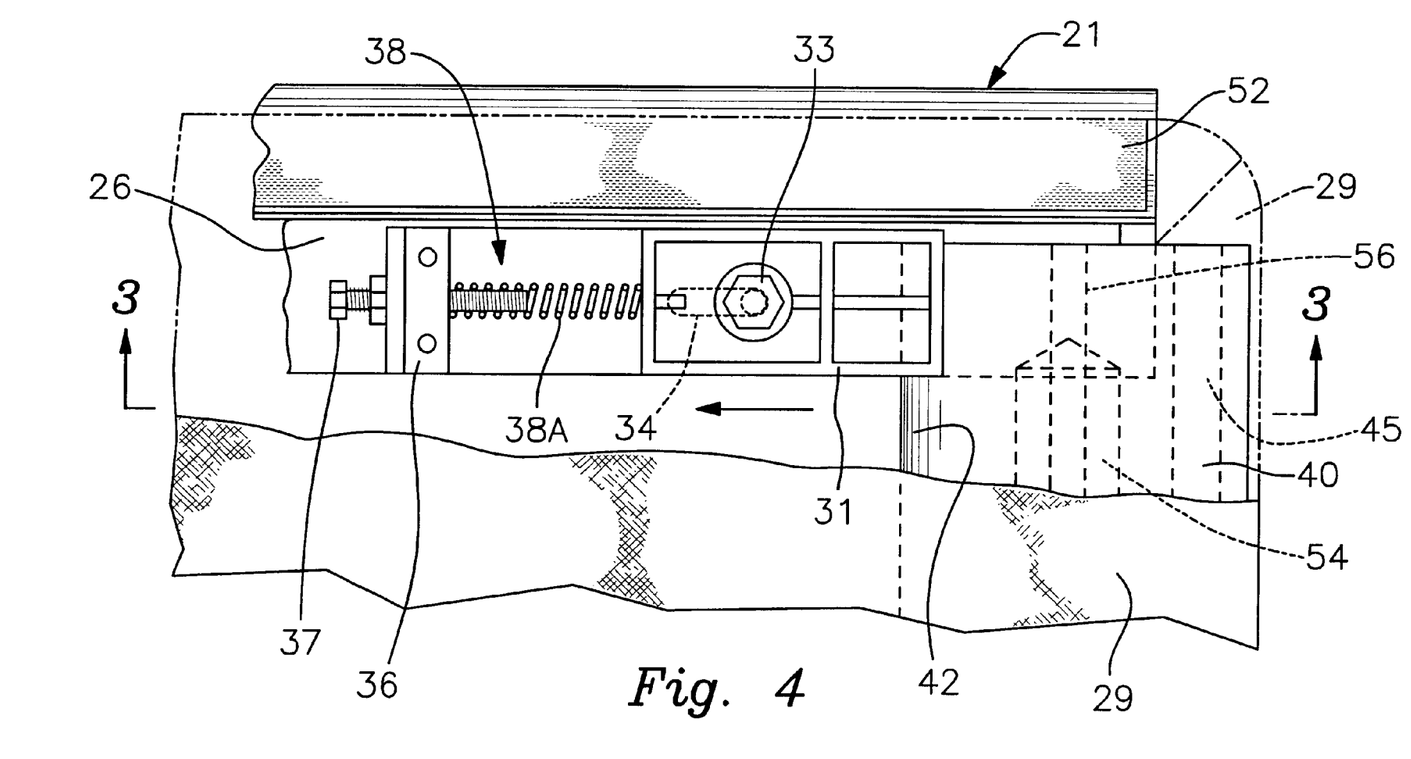
FIG. 4 is an enlarged partial top plan view of the retaining assembly as seen in FIG. 3 of the drawings.
Figure 5:
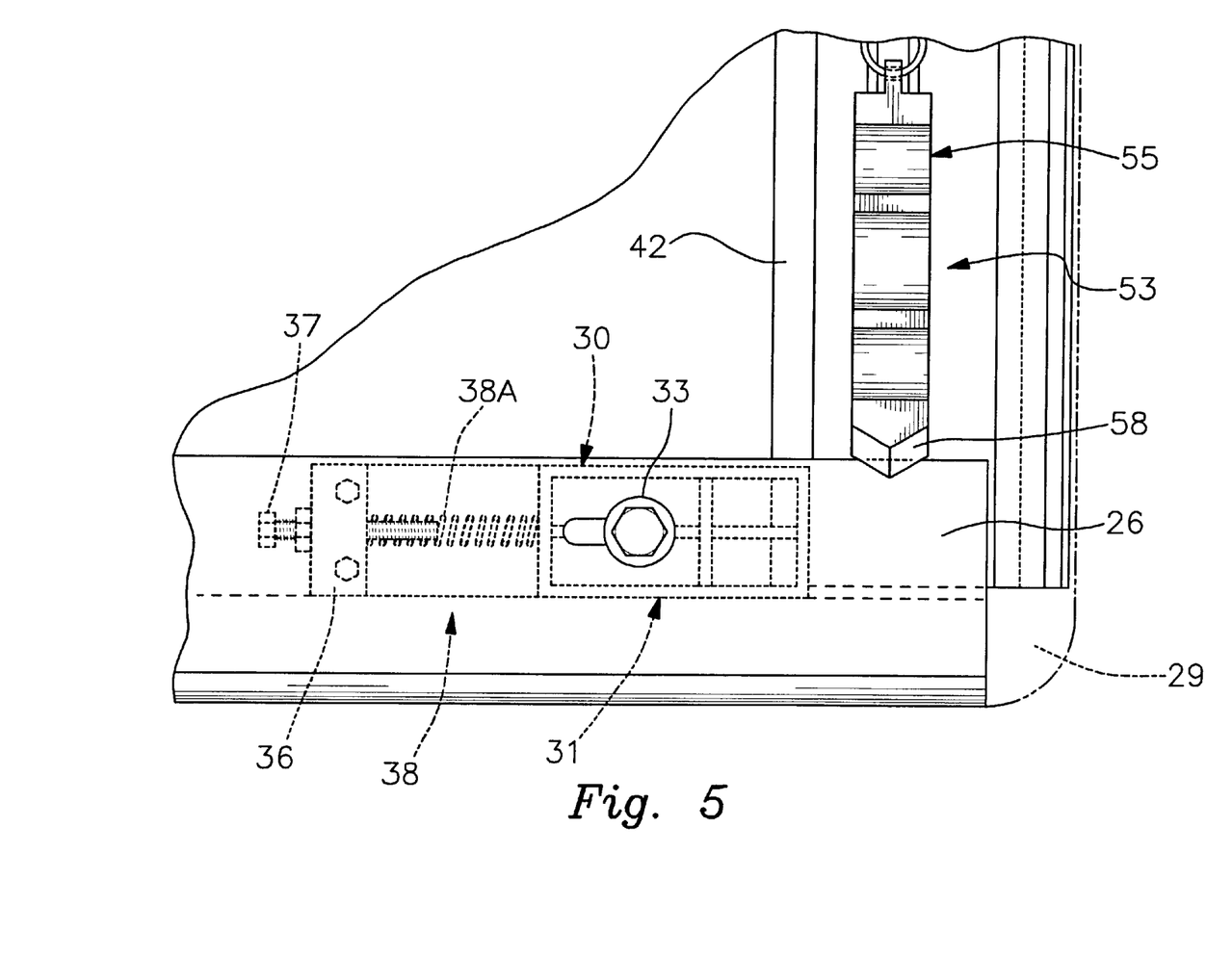
FIG. 5 is an enlarged partial bottom plan view of the retaining assembly as seen generally in FIGS. 3 and 4 of the drawings.

Referring now to FIGS. 2 and 3 of the drawings, a retractable engagement end rail 40 extrusion can be seen identical to that of front rail 22 having a contoured upper surface 41 with an elongated engagement surface 42 and an oppositely disposed cover attachment end portion 43. The engagement surface 42 is a an elongated half circular surface that is pivotally engaged during use under the tapered end walls 32 of the respective blocks 31 as seen in broken lines in FIG. 3 of the drawings.

The cover attachment end portion 43 has a contoured surface 44 with a circular elongated mounting channel 45 therein. An elongated cover engagement fitting 46 is attached along a back edge 47 of the cover 29 by conventional means and is slidably positioned within the respective mounting channel 45 thus securing the free edge of the cover 29 to the front rail 22.

It will be seen that the engagement portion 42 of the end rail 40 is initially engaged against the tapered end walls 32 of the respective blocks 31 as seen in broken lines in FIG. 3 of the drawings. The engagement portion 42 is then, as noted previously, pivoted downwardly as seen in broken lines against the tension of the fabric cover 29 displacing the sliding blocks 31 against their respective springs 38B until full engagement with respective side rails 20 and 21 as illustrated in solid lines in FIG. 3 of the drawings is achieved.

The fabric cover 29 as seen in FIGS. 1, 6 and 8 of the drawings extends when deployed over the frame 19 in a stretched taunt fashion. In order for the cover 29 to be supported over the truck bed, it has a plurality of longitudinally spaced transverse support ribs 48 attached to an under surface 29A of the cover by engagement of a plurality of fabric elastic pockets 49 extend in spaced longitudinal relation to one another along the oppositely disposed perimeter edges 50 of the cover 29. The ribs 48 are inserted therein by their ends, as best seen in FIGS. 6 and 8 of the drawings. The cover 29 is removably secured to the respective rails 20 and 21 by strips of hook and loop material M on their respective outer curved surfaces 27 and correspondingly aligned strips of hook and loop material M secured along the cover's underside respective longitudinal side edges 51 and 52 as seen in FIGS. 9 and 10 of the drawings.

A locking assembly 53 is mounted to the underside of the end rail 40, best seen in FIGS. 5, 6, 7 and 12 of the drawings having a pair of oppositely disposed spring urged locking slides 54 and 55 which are mounted within a channel 56 formed in the under surface of the end rail 40. Each of slides 54 and 55 having a contoured body member 57 with a tapered engagement end surface 58 and an upstanding spring retainer and guide 59 assembly which slidably retains the respective slides 54 and 55 within the channel 56 between pairs of limit fittings 60A and 60B.

Figure 7:
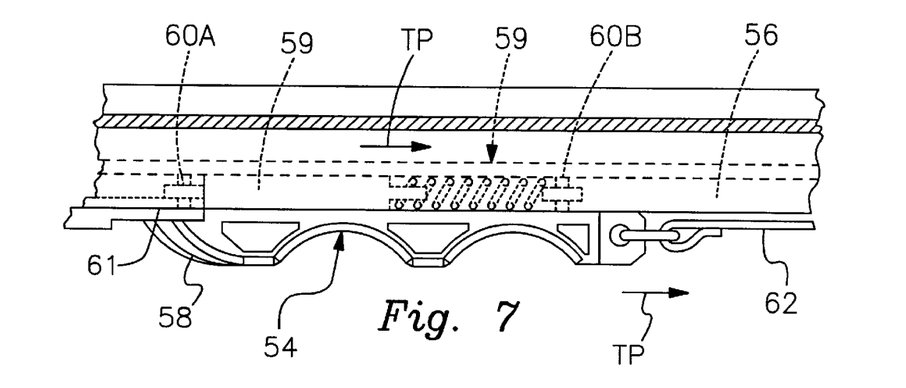
FIG. 7 is an enlarged side elevational view of a portion of the release assembly for the retaining assembly seen in FIGS. 5 and 6 of the drawings.

Referring now specifically to FIGS. 7 and 8 of the drawings, the limit fittings 60A and 60B are illustrated as defining a travel path for the respective slides 54 and 55 indicated by directional arrows TP. The respective safety slides 54 and 55 will registerably extend over the respective edges 61 of the side rail base 26 by the spring retainer and guide assembly 59. Each of the safety slides 54 and 55 have a release strap 62 and 62A respectively extend there from to strap fastener 62C and 62D secured to the channel 56 by fasteners F. They can be used selectively to retract the slides 54 and 55 allowing the end rail 40 to be released from engagement with the engagement assemblies 30.

Figure 11:
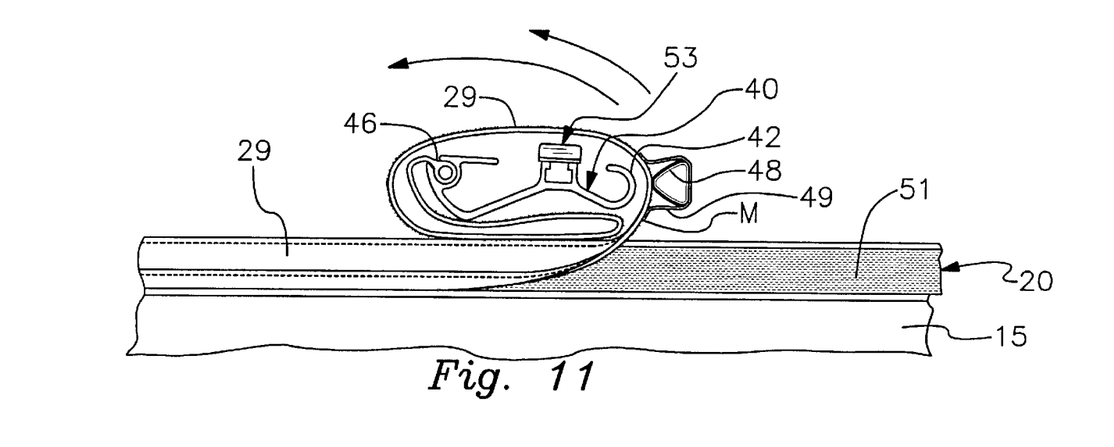
FIG. 11 is a partial side elevational view of the tonneau cover of the invention in partial retractable position.
Figure 12:
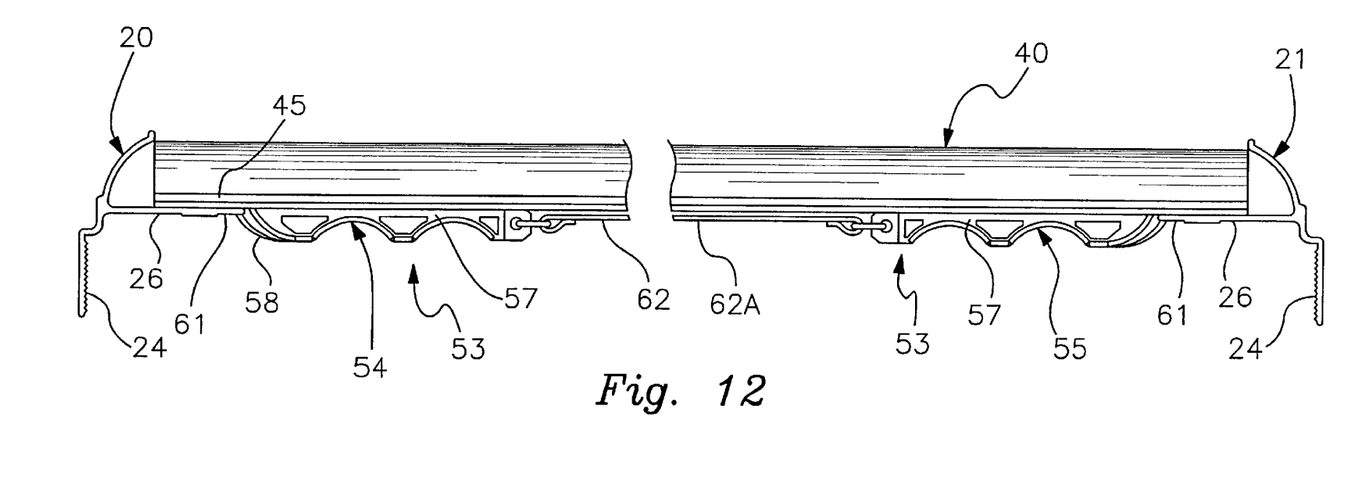
FIG. 12 is a partial end elevational view of the retaining rail assembly of the invention with portions broken away.

Once the end rail 40 is released it is used as a core to roll up the cover 29 thereon as illustrated in FIGS. 1 and 11 of the drawings. As the cover 29 is rolled up, it will release from the respective side rails 20 and 21 allowing access to the truck bed 13.

It will be evident from the above description that once fully rolled up, the cover 29 is secured by a pair of retaining straps 63 and 64 having hook and loop material on their respective end surfaces 63A and 64A safety storing the cover 29 in rolled up fashion over the front rail 22 of the tonneau cover assembly 10.

To deploy the cover 29 the respective strap pairs 63 and 64 are released and the cover 29 unrolled until the end rail 40 is exposed and then resiliently engaged against the respective sliding blocks 31 which yield as the end rail 40 is pivoted into place against the respective rails 20 and 21 and secured thereto by the automatic registration of the hereinbefore described safety slides 54 and 55. The inner engagement i.e. interlocking of the respective hook and loop material M along the side rails 20 and 21 and the aligned, now engaged longitudinal edges of the cover 29 are confirmed, securing the cover 29 tautly in place over the truck bed 13.

As noted, it is an important aspect of the hereinbefore described cover assembly 10 of the invention is that the cover 29 when deployed is temporarily held in place on the support frame by engagement of the end rail 40 under the tension of the cover 29 with the resilient locking blocks 31 of the respective engagement assemblies 30. The respective slides 54 and 55 lock the cover in place.

It will thus be seen that a new and novel tonneau cover configuration for a pick-up truck bed has been illustrated and described and it will be apparent to those skilled in the art that various changes may be made therein without departing from the spirit of the invention.

Therefore we claim:

1. A cover assembly for use on a pick-up truck bed, said cover assembly comprising,
   a main support frame affixed about an opening defined by the truck bed,
   a fabric cover releaseably secured to said support frame,
   said support frame having a pair of oppositely disposed side rails on side walls of said truck bed,
   a front rail secured between said side rails and an end rail resiliently retained between the free ends of said side rails,
   a plurality of cross support ribs on said cover registerable with said respective side rails,
   means for attaching said cover to said respective front and end rails,
   self-adjusting resilient retaining assemblies on said respective side rails selectively engaged to said end rail,
   locking means slidably disposed on said end rail registerably engageable over portions of said respective side support rails,
   means for removably securing said cover along its oppositely disposed elongated edge surfaces with corresponding aligned surface of said respective side rails.

2. The cover assembly set forth in claim 1 wherein said resilient retaining assemblies comprise,    self-adjusting sliding blocks,    independent spring fittings engaging said blocks for urging said blocks towards said free end of said side rails.

3. The cover assembly set forth in claim 1 wherein said end rail comprises, a contoured upper surface, an elongated engagement surface and an oppositely disposed cover attachment end surface.

4. The cover assembly set forth in claims 2 and 3 wherein said elongated engagement surface defines a transversely arcuate surface registerably against and under tapered end surfaces of said respective sliding blocks.

5. The cover assembly set forth in claim 1 wherein said locking means slidably disposed from within said end rail comprises,    a pair of oppositely disposed spring urged elements registerable within an elongated channel in said end rail,    slide limit means in said channel, and means for retracting said slide elements independently towards one another.

6. The cover assembly set forth in claim 5 wherein said slide limit means comprises,    a pair of set fasteners secured within said channel in spaced relation to one another.

7. The cover assembly set forth in claim 1 wherein said means for removably securing said cover along its oppositely disposed edge surfaces with correspondingly aligned surface of said respective side rails comprises,    registerable surfaces of hook and loop material disposed on said covers respective perimeter surfaces and corresponding aligned surfaces of said respective side rails.

8. The cover assembly set forth in claim 1 wherein said means for attaching said cover to said respective front end rails comprises,    elongated rod inserts with cover engagement flanges extending there from.

9. The cover assembly set forth in claim 8 wherein said respective rod inserts are registerable within said transversely arcuate channels in said respective front and end rails.

10. The cover assembly set forth in claim 5 wherein said means for retracting said slide elements towards one another comprises straps extending from respective slide assemblies, said straps connected to said end rail in spaced relation to said respective slide assemblies.

\* \* \* \* \*